3,030,176
URANIUM SEPARATION PROCESS
Ward L. Lyon, Fremont, Calif., assignor to the United States of America as represented by the United States Atomic Energy Commission
No Drawing. Filed June 28, 1960, Ser. No. 39,418
3 Claims. (Cl. 23—14.5)

This invention relates to a novel method of separating uranium from mixtures with other actinides such as those resulting from the irradiation of uranium in nuclear reactors, more particularly of separating uranium oxides from mixtures with plutonium or thorium oxides.

As is well known, if nuclear reactors are to be operated economically, it is necessary that the unused uranium and other fissionable fuel values be recovered after each run or "pass." Only a fraction of the total fuel values can be utilized in a single pass through a reactor because of the accumulation of "poisons," fission products with large neutron absorption cross-sections, which put a stop to the nuclear reaction long before the fissionable material approaches exhaustion. When this happens the reactor run must be terminated by removing the used fuel and replacing it with fresh fuel, free from poisons. While, of late, the use of burnable poisons and improvements in designing reactors have increased the size of the fraction of fuel values utilized in individual reactor runs to some extent, no nuclear scientists believe that advancements along these lines will ever go so far that reprocessing of fuel elements can be dispensed with.

In addition to the removal of fission product poisons and re-enriching the fuel the reprocessing of fuel elements often includes the separation of uranium from plutonium, a transmutation product of the isotope uranium-238 created by its irradiation with neutrons during the reactor run. This is desired since the plutonium, though a fissionable fuel that can sometimes be used in the same reactor with uranium, functions more efficiently in reactors designed especially for its particular characteristics, which are different in quite a few respects from those of uranium.

Very similar to the reprocessing of fuel elements from nuclear reactors is the processing of "blanket" elements in reactors of the "breeder" type. In these, tubes or other shapes containing "fertile materials" are inserted into reactors to cause them to be transmuted by the neutron flux, or "breed," into fissionable, or "fissile," materials. The best known of these at the present time are U-238 which is transmuted into Pu-239, and Th-232 which is transmuted into the fissionable isotope U-233. After such elements have been irradiated for a certain period it becomes advisable to separate the fissile material from its parent fertile material; unless this is done the fissile material will produce significant amounts of fission products due to fission within the reactor flux, and the blanket elements will thereby become increasingly difficult to handle. In either of the two cases of blanket element processing mentioned, uranium in one of its isotopic forms will require separation; in the case where U-238 is the fertile material it will be present in preponderant amount, with a minor amount of Pu-239 commingled with it, and in the second case the fertile material thorium will be preponderant with the fissile U-233 the minor component. However, as will be shown later, the chemistry of uranium removal is quite similar in both cases, and my invention provides a method for separating uranium in these, as well as in the case of fuel element reprocessing.

The methods for separating uranium from plutonium or thorium now in use were developed during the period when the nuclear reactor art largely employed fuel and blanket elements of the metallic type, but with the coming of oxide fuels and oxide blanket compounds, these methods are proving to be quite costly and inconvenient. Most reprocessing methods now known being either with the dissolution of the fuel or blanket elements in aqueous nitric acid, or with the melting of the metal elements pyrometallurgically. While $UO_2$ is not notably difficult to dissolve in nitric acid $ThO_2$ is exceedingly resistant to acids; both these refractory materials are, of course, resistant to melting, urania, in fact being used in glass-making and for making ceramic crucibles. $PuO_2$, while less well known due to its being a product of nuclear reactors exclusively, resembles $ThO_2$ in its resistance to the action of acids and to melting. When either $ThO_2$ or $PuO_2$ are intermixed with $UO_2$ as in a blanket corrosive acid mixtures of normalities of between 6 to 8 must be used; the dissolution, moreover, is slow and attended with many difficulties such as complex formation, partial decomposition of the acids, and other undesirable side reactions. Containment of acid mixtures such as these is, of course, difficult, and stainless steel equipment cannot be used due to corrosion. This is a serious drawback since stainless steel is much less expensive than the materials which have been developed to contain acids of the strengths mentioned.

Another disadvantage of aqueous reprocessing methods is the danger of criticality accidentally arising due to the presence of a good moderator in the form of the water. This danger is largely avoided in pyrometallurgical methods, but unfortunately the high melting points of the actinide oxides make it impractical to reprocess them in the molten state.

It is, therefore, an object of the invention to provide a method of separating uranium oxides from mixtures with the oxides of other actinides without the use of strong mineral acids or melting.

It is a more particular object of the invention to provide a method for separating uranium dioxide from plutonium dioxide without the use of strong mineral acids or melting.

It is a more particular object of the invention to provide a method of separating uranium dioxide from thorium dioxide without the use of strong mineral acids or melting.

It is a more particular object of the invention to provide a novel, economical way for reprocessing nuclear reactor fuel elements without the presence of a good moderator capable of causing accidental criticality.

It is a more particular object of the invention to provide a novel, economical method for processing nuclear reactor blanket elements without the presence of a good moderator capable of causing accidental criticality.

It is a more particular object of the invention to provide a novel, economical method for reprocessing nuclear reactor fuel elements of the oxide type, with lower costs for equipment than are necessary with present methods.

It is a more particular object of the invention to provide a novel, economical method for processing nuclear reactor blanket elements of the oxide type with lower costs for equipment than are necessary with present methods.

All the foregoing objects are attained by my discovery that, instead of using an aqueous solvent, or melting, for handling actinide materials, a fused salt solvent permits within a critical temperature range the selective chlorination of uranium dioxide alone, whereby it goes easily into a solution as uranyl chloride, leaving all the other actinide oxides undissolved, so that they may easily be filtered out. After filtration the uranium may be removed by zinc metal, which brings about a quantitative reduction of the uranyl chloride to the dioxide, which may then be filtered. My fused salt solvent system, furthermore, has the advantage of being practically stable to heat and radioactivity, so that the material may be handled in concentrated form, without the danger of criticality accidentally arising due to the presence of a good moderator.

In carrying out my invention the reactants should be thoroughly mixed. Since uranium dioxide and the other actinide oxides are completely insoluble in the fused salt, it is desirable that they be stirred together.

A chlorinating agent such as chlorine gas is then added to the mixture, whereupon the uranium dioxide as well as any other minor amounts of higher or lower oxides of uranium that may be in the mixture in ordinary urania, completely dissolve and go into true solution with the fused salt melt. This is strictly quantitative and therefore no doubt can exist that the reaction may be represented as:

$$UO_2 + Cl_2 \rightarrow UO_2Cl_2$$

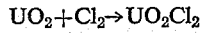

No less quantitative, however, is the refusal of $ThO_2$ to react in a similar manner; careful experiment has shown this refractory, as well as any other minor amounts of higher or lower thorium oxides that may be present in ordinary thoria, to be completely unaffected.

In the case of $PuO_2$, however, while by far the major portion of it remains inert to chlorination as does thoria, a small fraction does react and go into solution. The amount that follows the latter course is, within the temperature range of 700–800°, about 1.7 mole percent, which gives my process a separation factor between $UO_2$ and $PuO_2$ of about 58. This gives a sufficiently complete separation for power fuel reprocessing purposes since the presence of a minor amount of plutonium is no disadvantage to a power reactor.

Any chlorinating agent may be used to react with the uranium dioxide that does not cause undesirable side reactions. Sulfonyl chloride, phosphorous trichloride, phosphorous pentachloride and the like may be used, but I prefer one of the gases of the group consisting of elemental chlorine and phosgene, both of which may be bubbled through the fused salt solution until the reaction with the uranium dioxide is complete. I carry out my process at temperatures between 700–800° C.; this appears to be rather critical and the reaction does not proceed satisfactorily either above or below this range.

When phosgene is used instead of chlorine it pyrolyzes first into carbon monoxide and chlorine, and then the reaction with the $UO_2$ proceeds as set forth in the equation above. The same is probably true when other chlorinating agents are used.

As to the solvent, any fused highly ionic salt such as the alkali halides may be used. The solvent salts of my invention are for all practical purposes immune to radiation damage or vaporization, and any heat that builds up due to radiation simply helps the reaction to proceed without harm. Moreover, because so little solvent is required, my invention can be carried out in comparatively small space, and quite simply by remote control, with no complicated pulsed columns or ion-exchange columns to get out of order. Preferably, I employ 32 parts by weight of NaCl-KCl eutectic to one part of mixed actinide oxides.

After the conversion of the $UO_2$ to uranyl form in the salt melt has been made complete by the chlorinating agent, the latter should be withdrawn in order to hold the reaction of $PuO_2$ to a minimum. The melt is then filtered while still hot in a quartz wool, sintered glass, sintered refractory metal or other such filter, whereby the actinide oxides other than the oxides of uranium are removed in the filter cake, the uranyl chloride passing through with the filtrate. The uranyl chloride may then be reduced by a reducing agent such as electrolysis or a reducing metal. Magnesium may be used if added carefully, but if excess Mg is allowed to remain in contact too long some of the uranium may be reduced to the metallic state as well as to the dioxide state. I have discovered that metallic zinc quantitatively reduces the uranyl chloride to uranium dioxide and hence consider this a critical matter rather than merely one of preference. No harm can come of an overaddition of this metal, but for practical reasons, of course, it is well not to exceed the requirements of stoichiometry too far.

The usefulness of my invention is not confined to treating simple mixtures of uranium oxides and other actinide oxides. Other substances may be present, even the complicated mixture of structural materials, unused actinide oxide fuel or blanket values, fission and transmutation products, when oxide fuel or blanket elements are withdrawn from a reactor after a run. Due to the complexity of fuel and blanket reprocessing it is not possible to specify all the various stages in which my process could be of service. While, with clad fuel elements, the process of my invention does not result in a pure uranium dioxide or other actinide oxides, it does narrow down the field of contaminants greatly, and in so doing is of great use. If pure actinide oxides are desired, they may be obtained by further separation methods, but these will be much simplified by the previous narrowing down mentioned.

500 mg. of $UO_2$-$PuO_2$ mixed oxides, having a U/Pu mole ratio of 5, was added to 16 g. of molten NaCl-KCl eutectic in a quartz tube in a furnace with a controlled temperature of 800° C. Phosgene gas was bubbled through the mixture for two hours. After this treatment only a small amount of insoluble material remained, and the salt melt was reddish in color. The melt was filtered in a quartz wool filter at 800° C. The filtrate passing through the filter was dissolved in dilute HCl and assayed for both uranium and plutonium. It was found to have 0.12 g. per liter of uranium and 0.000416 g. per liter of plutonium; the mole ratio of U/Pu was, therefore, 290/1. The separation factor was 290×⅕, or 58.

*Example II*

One mole each of sodium and potassium chlorides were melted together in a Kjeldahl flask. One-tenth mole of ceramic grade $UO_2$ was added. A sparge of phosgene gas was started and maintained for two hours while the melt was held at 700–750° C. The uranium dioxide was completely dissolved.

Portions of this salt solution were treated separately with magnesium metal, and with zinc metal, whereupon reductions of the uranyl chloride to uranium dioxide occurred. The reduction with magnesium was quite rapid resulting in a colorless salt phase and a reddish brown precipitate identified as $UO_2$. The reduction with zinc metal was less rapid, but also resulted in the precipitation of uranium dioxide.

It will be understood that this invention is not to be limited to the details given herein, but that it may be modified within the scope of the appended claims.

What is claimed is:

1. A method for separating uranium oxides from the oxides of other actinides, comprising suspending the oxides in a melt consisting essentially of only halide anions and alkali metal cations, introducing a chlorinating agent selected from the class consisting of elemental chlorine and phosgene at a temperature between 700° and 800°

C., whereby the uranium oxides are selectively chlorinated to uranyl chloride and dissolved in the melt and the oxides of the other actinides remain unchlorinated and undissolved, and filtering the undissolved oxides of the other actinide oxides from the melt.

2. The method of claim 1 where the melt is the NaCl-KCl eutectic and the chlorinating agent is phosgene.

3. The method of claim 1 where the filtrate resulting from the filtering is treated with metallic zinc whereby the uranyl chloride is reduced to uranium dioxide.

References Cited in the file of this patent

UNITED STATES PATENTS

| | | |
|---|---|---|
| 2,887,356 | Arnoff | May 19, 1959 |
| 2,948,586 | Moore | Aug. 9, 1960 |

OTHER REFERENCES

Katz: "The Chemistry of Uranium," p. 581 (1951).
AEC Document HW-62431, pp. 2-16, Oct. 20, 1959.